US012663048B2

(12) United States Patent　　　　(10) Patent No.:　　US 12,663,048 B2

Wang　　　　　　　　　　　　　　　　(45) Date of Patent:　　　Jun. 23, 2026

(54) CONNECTING SEAT FOR DISC BRAKE

(71) Applicant: CCYS HI-TECH INTERNATIONAL LTD., Taichung City (TW)

(72) Inventor: Sheng-Yu Wang, Taichung City (TW)

(73) Assignee: CCYS HI-TECH INTERNATIONAL LTD., Taichung City (TW)

( * ) Notice: Subject to any disclaimer, the term of this patent is extended or adjusted under 35 U.S.C. 154(b) by 496 days.

(21) Appl. No.: 18/225,478

(22) Filed: Jul. 24, 2023

(65) Prior Publication Data

US 2024/0309917 A1　　　Sep. 19, 2024

(30) Foreign Application Priority Data

Mar. 17, 2023　　(TW) ................................. 112202383

(51) Int. Cl.
F16D 55/225　　　　(2006.01)

(52) U.S. Cl.
CPC .................................. F16D 55/225 (2013.01)

(58) Field of Classification Search
CPC ... F16D 55/225–227; F16D 2055/0008; F16D 65/0056; F16D 65/02; F16B 37/122
See application file for complete search history.

(56) References Cited

U.S. PATENT DOCUMENTS

| | | | | |
|---|---|---|---|---|
| 2010/0078269 A1* | 4/2010 | Tokunaga | ............. | F16D 55/228 |
| | | | | 188/73.46 |
| 2015/0001012 A1* | 1/2015 | Noborio | .................. | B62L 1/005 |
| | | | | 188/73.31 |
| 2020/0080605 A1* | 3/2020 | Hourihan | ................ | F16D 55/22 |

FOREIGN PATENT DOCUMENTS

GB　　　　　2225396 A　*　5/1990　...........　F16D 55/228

* cited by examiner

*Primary Examiner* — David R Morris

(74) *Attorney, Agent, or Firm* — Birch, Stewart, Kolasch & Birch, LLP

(57)　　　　　　　　ABSTRACT

A connecting seat for a disc brake includes a main body and a plurality of bushings. The main body includes a plurality of through holes. The bushings are fixedly jammed in the through holes of the main body respectively. The hardness of the bushings is larger than the hardness of the main body. Each bushing includes a first end surface, a second end surface, and a threaded hole penetrating through the first end surface and the second end surface. As a result, the connecting seat has advantages of light weight and great connecting strength.

12 Claims, 13 Drawing Sheets

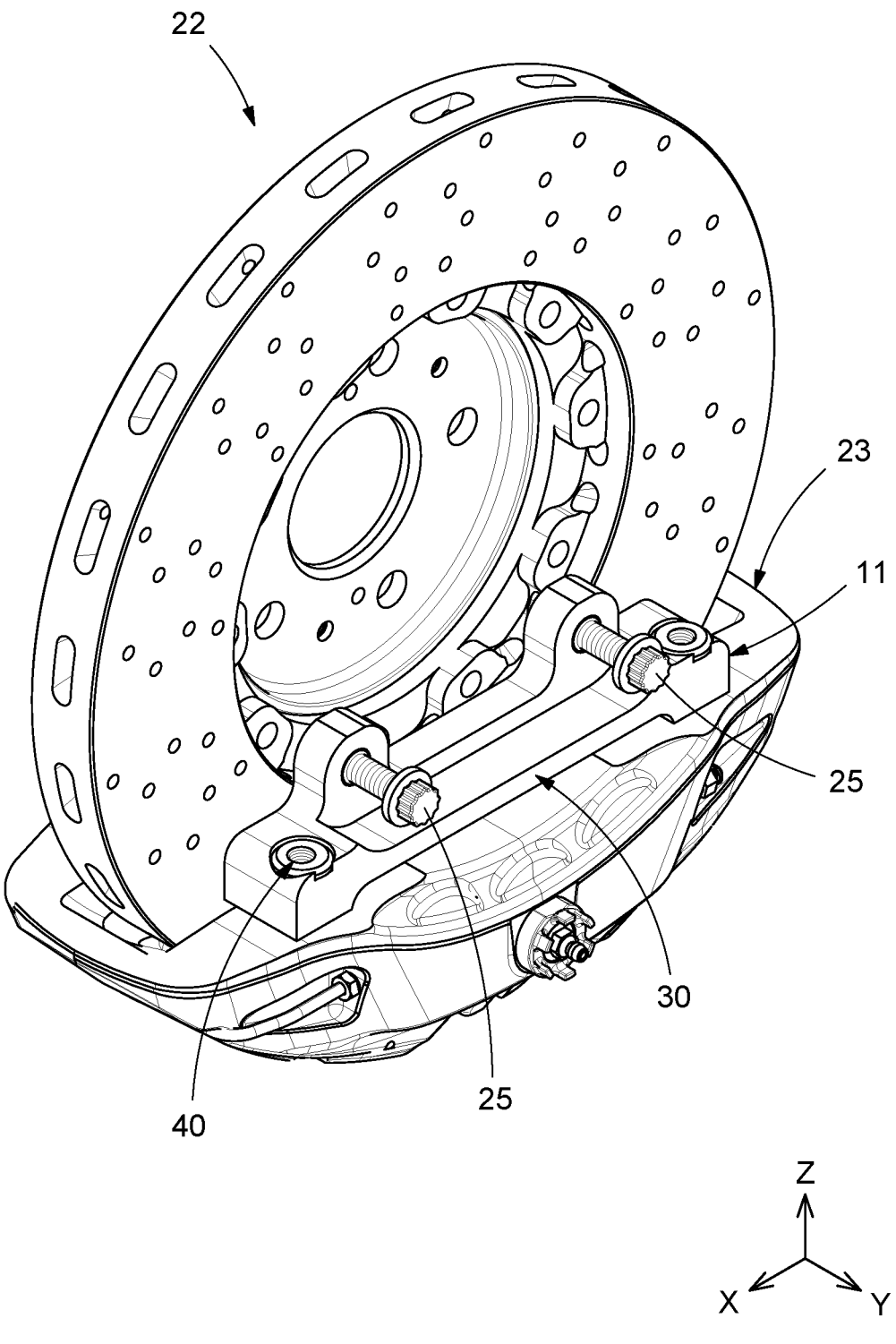
F I G . 1

30
P1
33
34
341
315
314 313
34
33
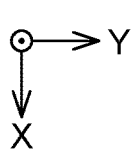
F I G. 5

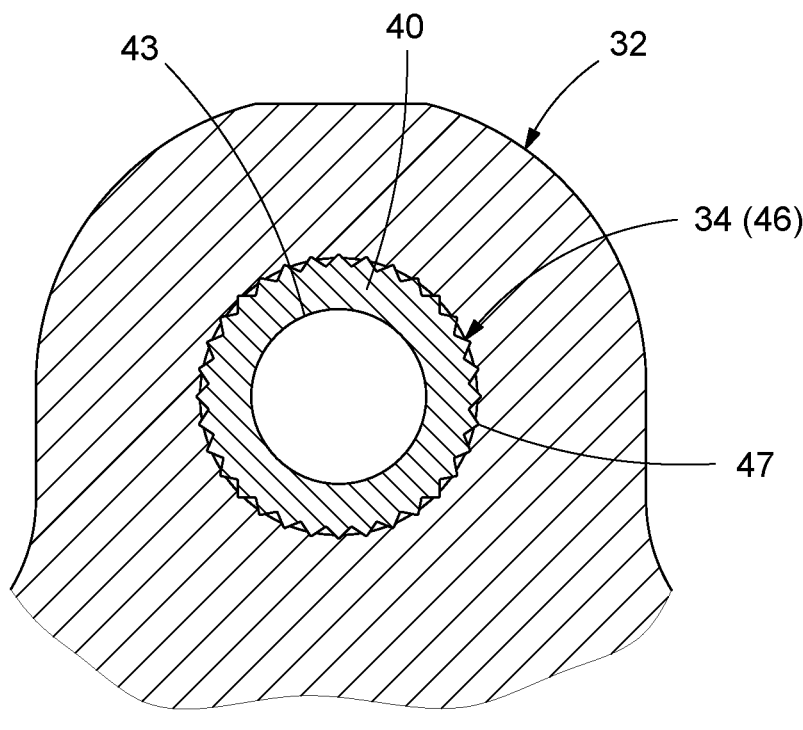
F I G. 8
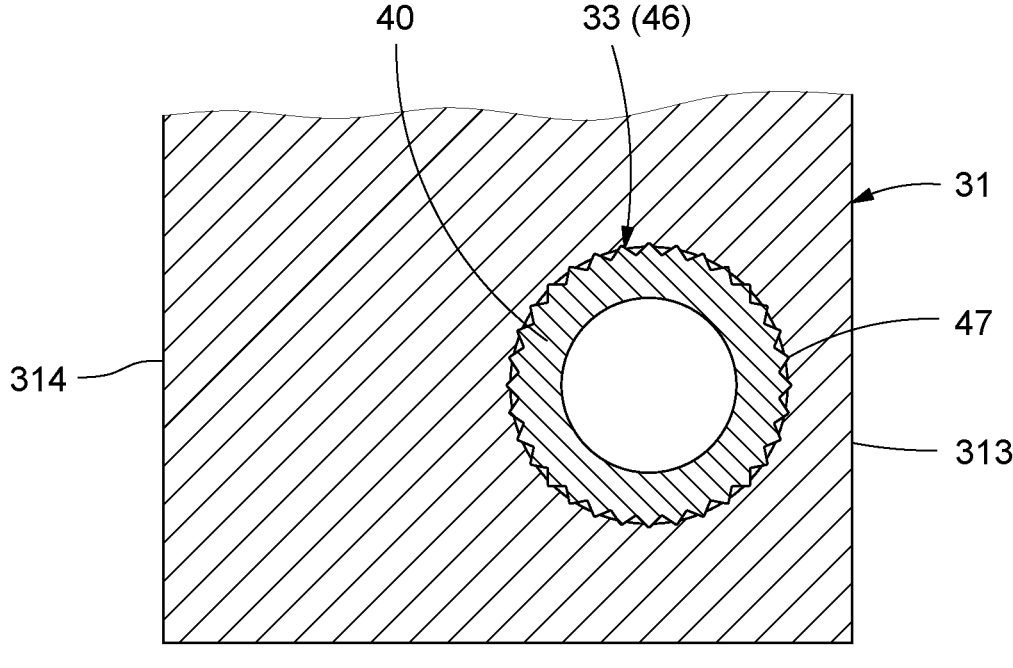
F I G. 9

CONNECTING SEAT FOR DISC BRAKE

BACKGROUND OF THE INVENTION

1. Field of the Invention

The present invention relates generally to disc brakes and more particularly, to a connecting seat for a disc brake.

2. Description of the Related Art

The conventional disc brakes are primarily operated in a way that the driver actuates a drive by a device such as a brake pedal or a button, so that the drive drives two brake pads of a caliper device, which are commonly referred to as linings, to make the brake pads clamp a brake disc fixed to a wheel, thereby attaining braking effect on the wheel. Wherein, a housing of the caliper device is fixed to a connecting plate through a connecting seat, so as to be connected to a suspension system of a vehicle chassis through the connecting plate.

The conventional connecting seat is made of cast iron, fastened to the housing of the caliper device by a plurality of bolts, and also fastened to the aforementioned connecting plate by a plurality of bolts. However, the bolts are mostly made of iron. Such connecting structure may have a great connecting strength, but quite heavy in weight. For vehicles requiring light weight, such as electric vehicles, this connecting structure has the disadvantage of overweigh and thereby needs improvement.

SUMMARY OF THE INVENTION

The present invention has been accomplished in view of the above-noted circumstances. It is an objective of the present invention to provide a connecting seat for a disc brake, which can combine both advantages of light weight and great connecting strength.

To attain the above objective, the present invention provides a connecting seat for a disc brake, which includes a main body and a plurality of bushings. The main body includes a plurality of through holes. The bushings are fixedly jammed in the through holes of the main body respectively. The hardness of the bushings is larger than the hardness of the main body. Each bushing includes a first end surface, a second end surface, and a threaded hole penetrating through the first end surface and the second end surface.

As a result, the main body of the connecting seat of the present invention can be made of the material with relatively smaller density, such as aluminum alloy, so as to attain the objective of light weight. By comparison, the hardness of the bushings has to be larger than the hardness of the main body, so the bushings can be made of the material with large hardness, which may be also relatively larger in density, such as iron. Such connecting seat is adapted for bolts to be fixedly screwed into the threaded holes of the bushings to fasten the connecting seat to a housing of a caliper device and a connecting plate for being connected to a suspension system, and the threaded holes can be prevented from the thread tripping problem resulted from overlarge force for fastening the bolts. Besides, the bushings are fixedly jammed in the through holes of the main body, that can prevent the bushings from being rotated along with the bolts. Therefore, the connecting seat of the present invention can combine both advantages of light weight and great connecting strength.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 1 is an assembled perspective view of a connecting seat according to a first preferred embodiment of the present invention, a disc brake and four bolts;

FIG. 5 and FIG. 6 are a top view and a side view of a main body of the connecting seat according to the first preferred embodiment of the present invention, respectively:

FIG. 8 to FIG. 11 are sectional views taken along the line 8-8, the line 9-9, the line 10-10 and the line 11-11 in FIG. 3, respectively:

DETAILED DESCRIPTION OF THE INVENTION

Figure 2:
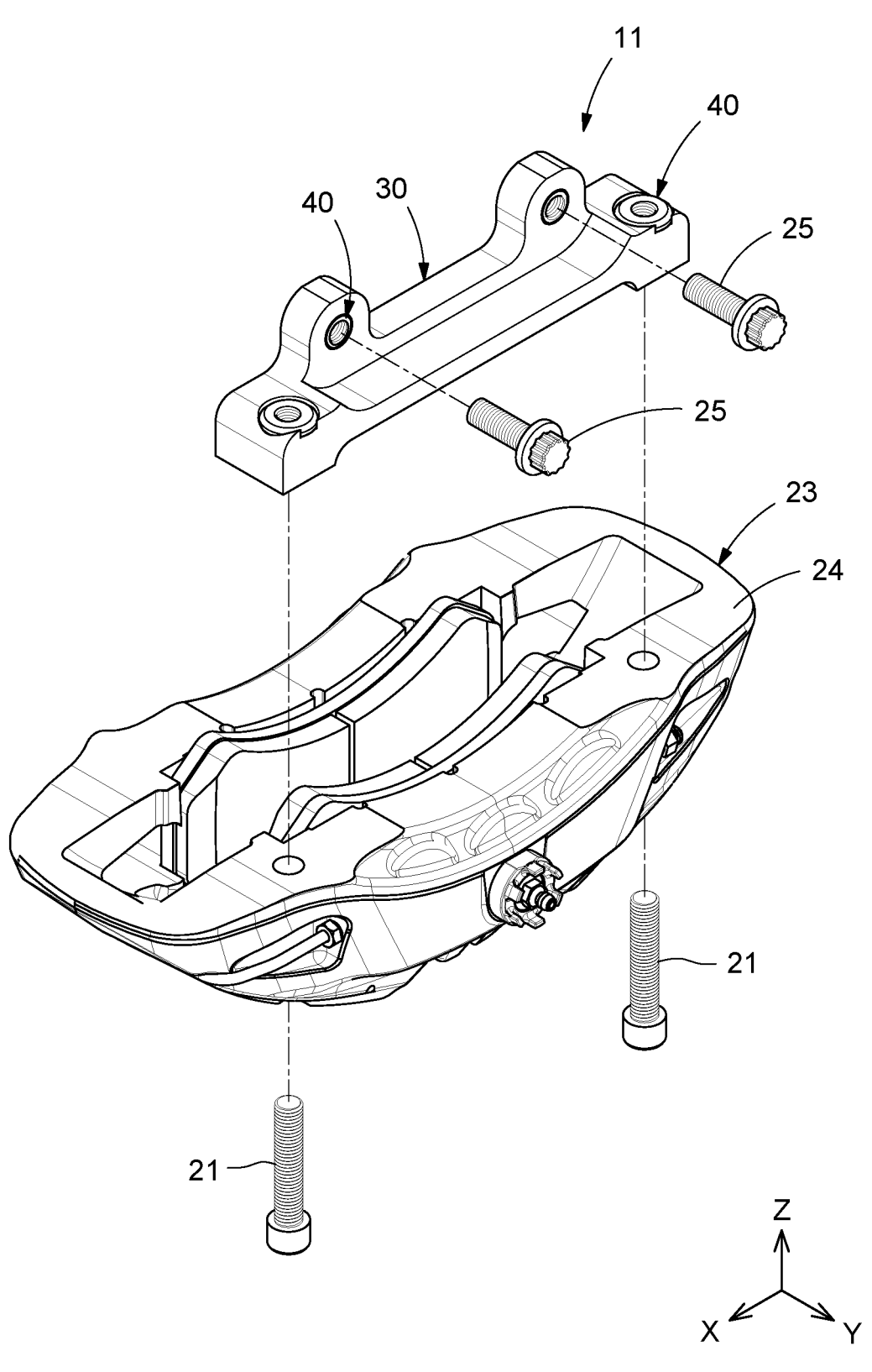
FIG. 2 is an exploded perspective view of the connecting seat according to the first preferred embodiment of the present invention, a caliper device of the disc brake and the bolts.

First of all, it is to be mentioned that same or similar reference numerals used in the following embodiments and the appendix drawings designate same or similar elements or the structural features thereof throughout the specification for the purpose of concise illustration of the present invention. It should be noticed that for the convenience of illustration, the components and the structure shown in the figures are not drawn according to the real scale and amount, and the features mentioned in each embodiment can be applied in the other embodiments if the application is possible in practice. Besides, when it is mentioned that an element is disposed on another element, it means that the former element is directly disposed on the latter element, or the former element is indirectly disposed on the latter element through one or more other elements between aforesaid former and latter elements. When it is mentioned that an element is directly disposed on another element, it means that no other element is disposed between aforesaid former and latter elements.

Figure 3:
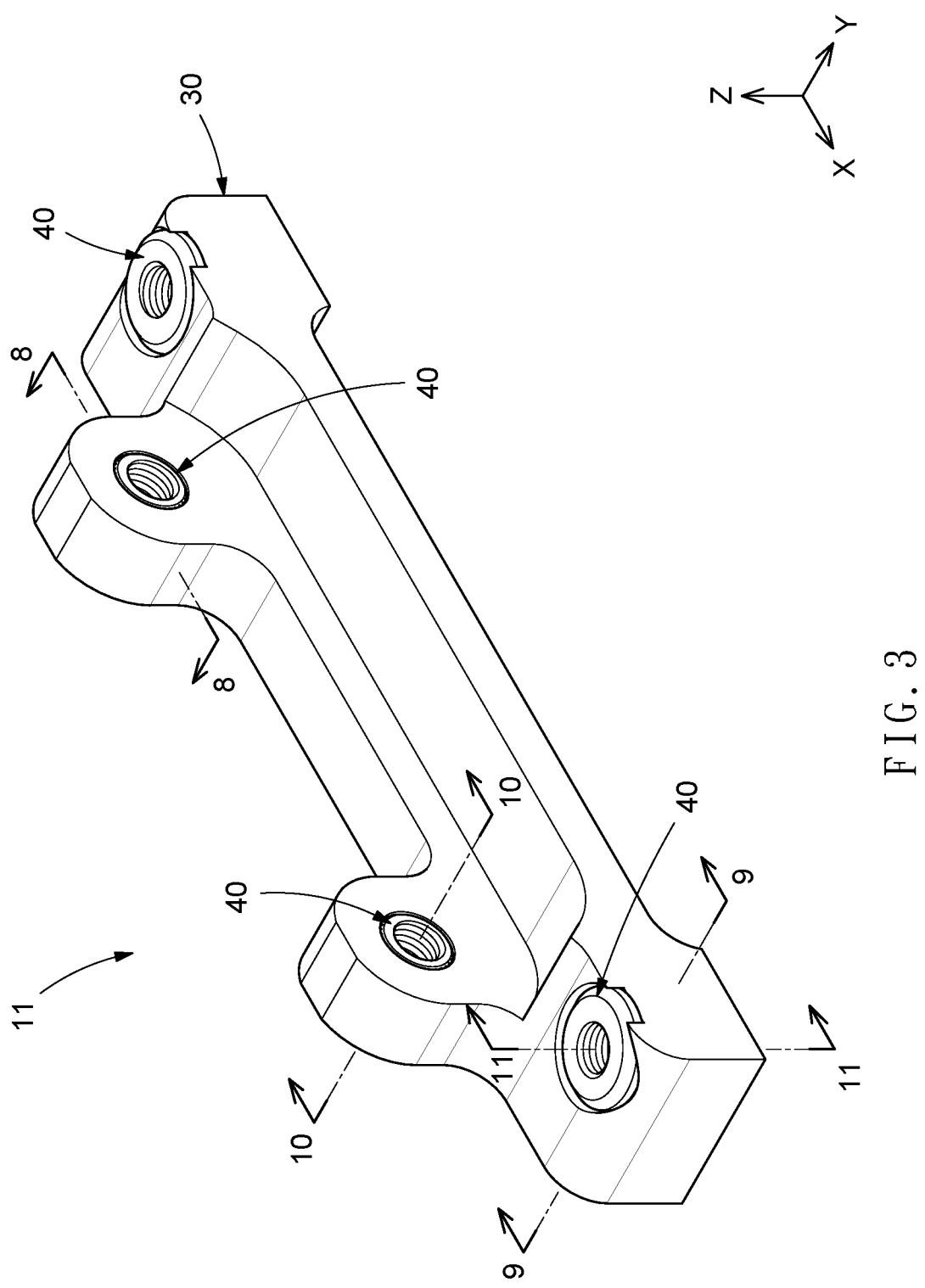
FIG. 3 and FIG. 4 are an assembled perspective view and an exploded perspective view of the connecting seat according to the first preferred embodiment of the present invention, respectively.
Figure 4:
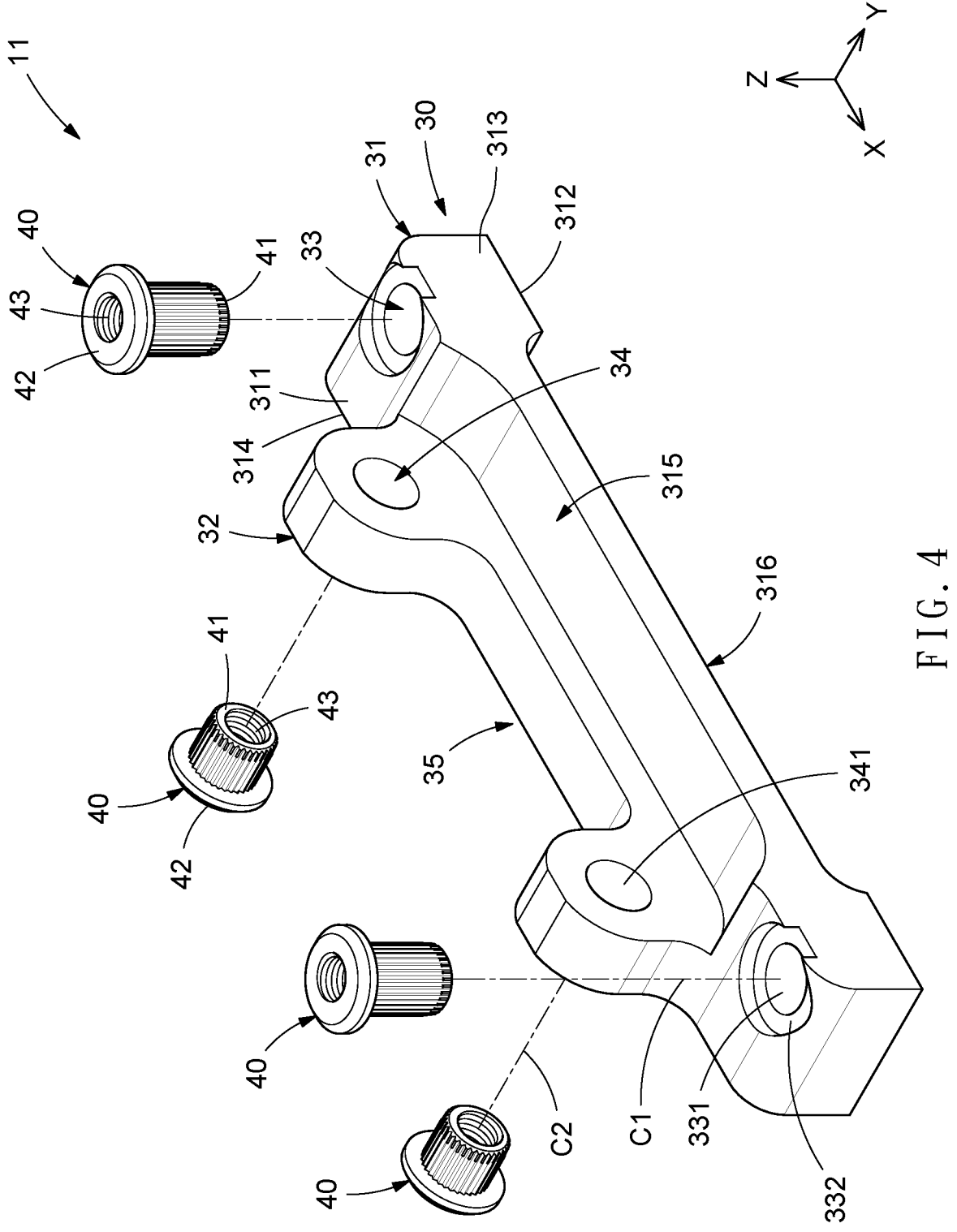

Referring to FIG. 1 and FIG. 2, a connecting seat 11 according to a first preferred embodiment of the present invention is adapted to be fastened to a housing 24 of a caliper device 23 of a disc brake 22 by two bolts 21. Besides, the connecting seat 11 is also adapted to be fastened to a connecting plate (not shown) by two bolts 25, so as to be connected to a suspension system of a vehicle chassis. Referring to FIG. 3 and FIG. 4, the connecting seat 11 of the present invention includes a main body 30 and four bushings 40.

In this embodiment, the main body 30 includes a base 31, two protrusions 32, and a plurality of through holes 33 and 34. The plurality of through holes 33 and 34 include two first through holes 33 penetrating through the base 31 along a first axis (Z-axis), and two second through holes 34 penetrating through the protrusions 32 along a second axis (Y-axis) respectively. The base 31 has an elongated shape. The first through holes 33 are located close to two ends of the base 31 respectively. The protrusions 32 are located between the first through holes 33, and located close to the first through holes 33 respectively. The base 31 includes a top surface 311 and a bottom surface 312, which face toward the positive and negative directions of the first axis (Z-axis) respectively, and a first side 313 and a second side 314, which face toward the positive and negative directions of the second axis (Y-axis) respectively. The first through hole 33 penetrates through the top surface 311 and the bottom surface 312, and adjoins the first side 313. The protrusion 32 protrudes from the top surface 311 toward the positive direction of the first axis (Z-axis), and adjoins the second side 314.

Figure 6:
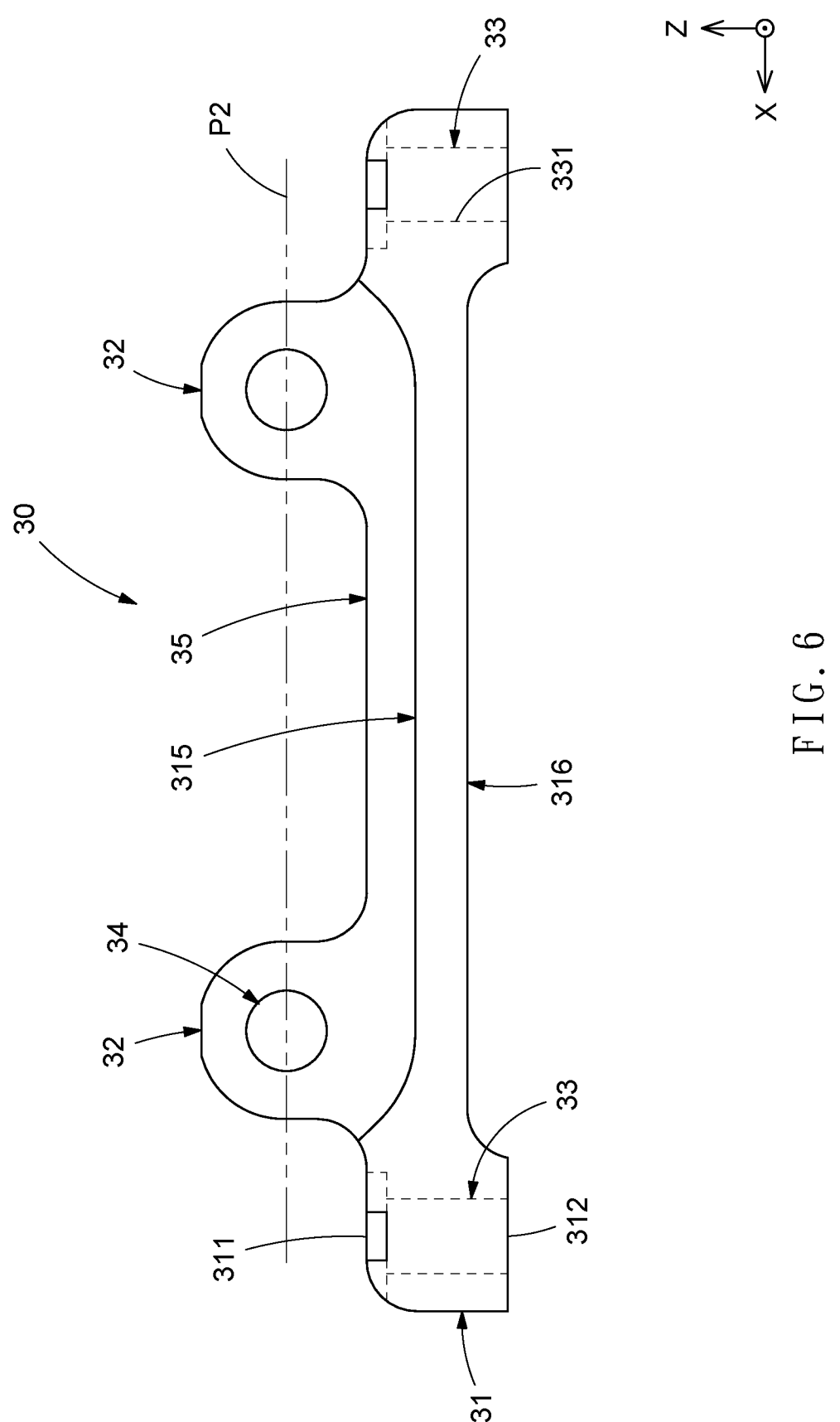

Further speaking, referring to FIG. 4 and FIG. 5, the first through hole 33 is defined with a first imaginary reference plane P1. The first imaginary reference plane P1 extends along the first axis (Z-axis) and a third axis (X-axis) perpendicular to the first axis (Z-axis) and the second axis (Y-axis). The first imaginary reference plane P1 includes the central axis C1 of the first through hole 33. In other words, the first imaginary reference plane P1 is an X-Z plane passing through the center of the first through hole 33. In this embodiment, the first imaginary reference plane P1 is separated from the second through holes 34, which means the first imaginary reference plane P1 doesn't pass through the second through holes 34. Besides, referring to FIG. 4 and FIG. 6, the second through hole 34 is defined with a second imaginary reference plane P2. The second imaginary reference plane P2 extends along the second axis (Y-axis) and the third axis (X-axis). The second imaginary reference plane P2 includes the central axis C2 of the second through hole 34. In other words, the second imaginary reference plane P2 is an X-Y plane passing through the center of the second through hole 34. In this embodiment, the second imaginary reference plane P2 is separated from the first through holes 33, which means the second imaginary reference plane P2 doesn't pass through the first through holes 33. Such configuration design makes the first through holes 33 and the second through holes 34 approximately deviated from each other in X-axial, Y-axial and Z-axial positions.

As shown in FIG. 4, the bushings 40 are disposed in the through holes 33 and 34 of the main body 30 respectively, wherein the bushings 40 disposed in the first through holes 33 and the bushings 40 disposed in the second through holes 34 are almost the same in shape, but a little different in length. One of the bushings 40 disposed in the second through holes 34 is shown in FIG. 7, and this serves as the representative for further illustration of the structure of the bushings 40 in the present invention.

Figure 7:
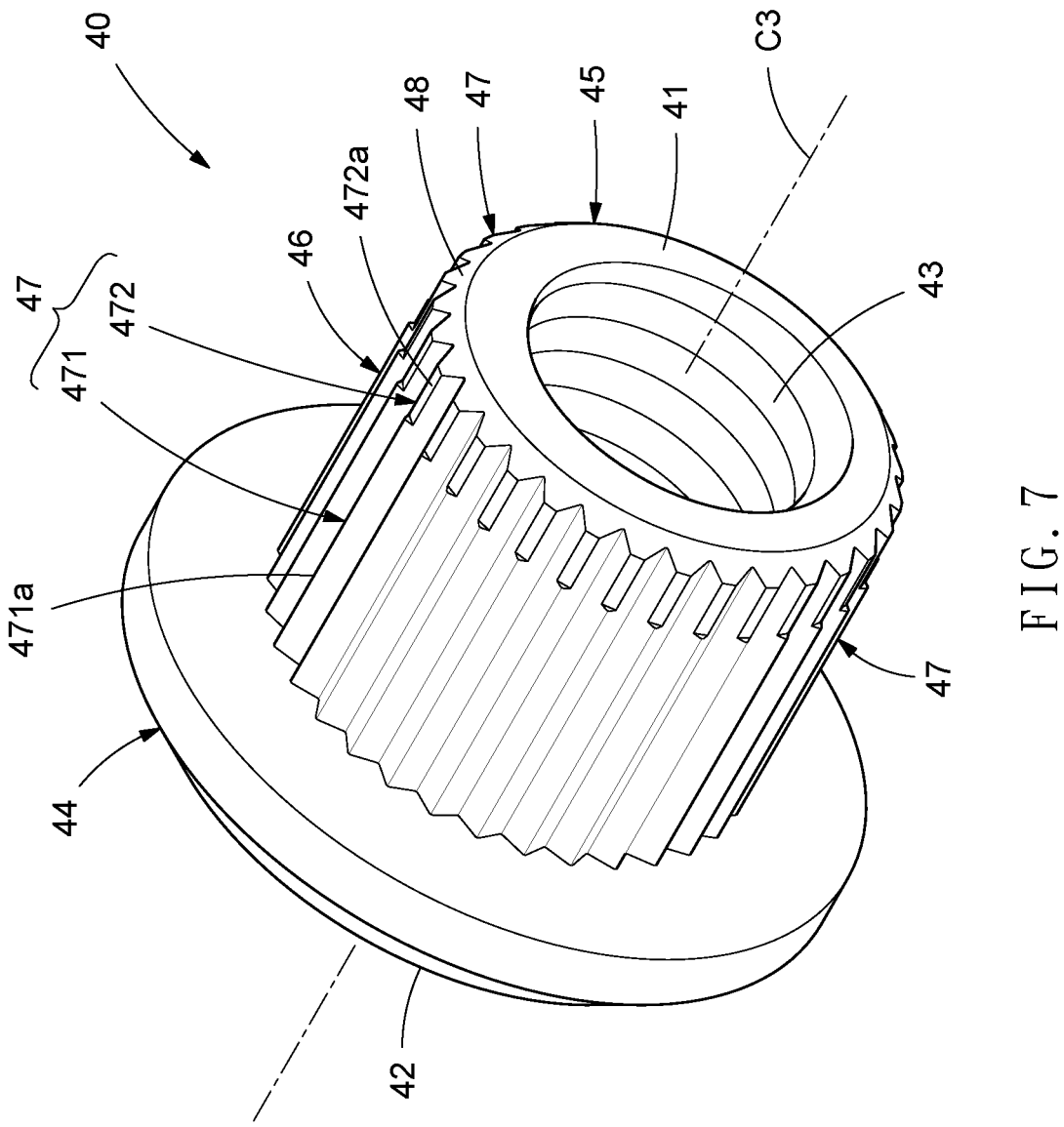
FIG. 7 is a perspective view of a bushing of the connecting seat according to the first preferred embodiment of the present invention.

As shown in FIG. 7, the bushing 40 includes a first end surface 41, a second end surface 42, and a threaded hole 43 penetrating through the first end surface 41 and the second end surface 42. As to the appearance of the bushing 40, the bushing 40 includes a head part 44 located at the second end surface 42, and a body part 45 smaller in outer radius than the head part 44. The body part 45 has an outer surface 46 which is rough. The outer surface 46 includes a plurality of tooth portions 47 arranged in a circle continuously. Each tooth portion 47 extends parallel to a central axis C3 of the bushing 40 where the tooth portion 47 belongs to. Further speaking, each tooth portion 47 includes a main section 471 extending from the head part 44 toward the first end surface 41. The main section 471 is taper in cross-sectional shape so that the outer surface 46 of the body part 45 of the bushing 40 has sawtooth-shaped cross sections at the location of the main sections 471, as shown in FIG. 8 and FIG. 9. Each tooth portion 47 further includes a truncated section 472 connected with the main section 471. The truncated section 472 has a top surface 472a. Among the truncated section 472, the top surface 472a is farthest away from the central axis C3 of the bushing 40 where the truncated section 472 belongs to. The main section 471 has a peak end 471a. Among the main section 471, the peak end 471a is farthest away from the central axis C3 of the bushing 40 where the main section 471 belongs to. The top surface 472a of the truncated section 472 is closer to the central axis C3 than the peak end 471a of the main section 471 is. In other words, the body part 45 of the bushing 40 has a relatively larger outer radius at the location of the main sections 471 of the tooth portions 47, and has a relatively smaller outer radius at the location of the truncated sections 472 of the tooth portions 47. The aforementioned outer radius at the location of the truncated sections 472 is approximately equal to or smaller than the inner radius of the associated through hole 33 or 34. Besides, each bushing 40 further includes a chamfering surface 48. The chamfering surface 48 is connected between the first end surface 41 and the truncated sections 472 of the tooth portions 47.

Figure 10:
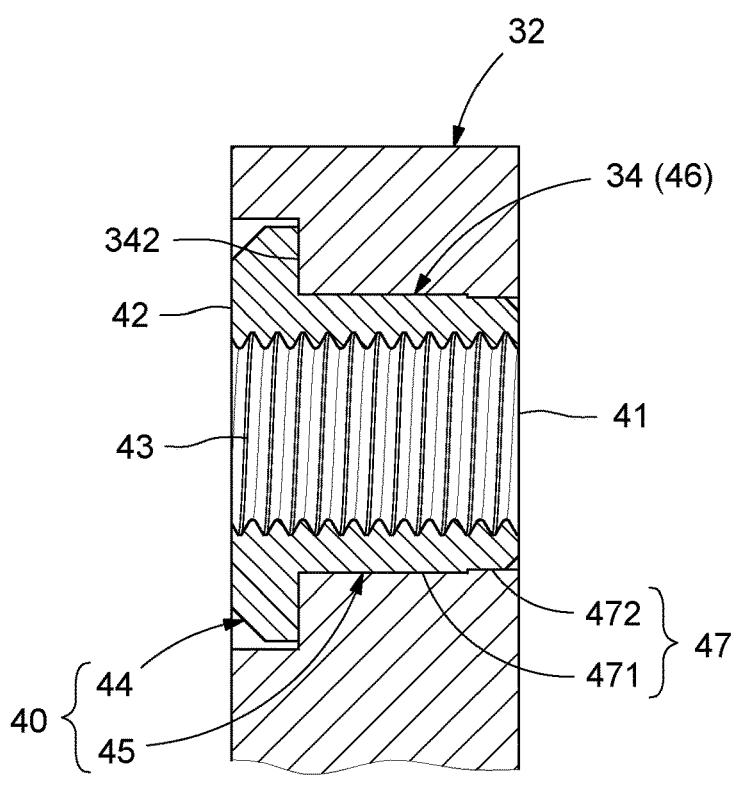
Figure 11:
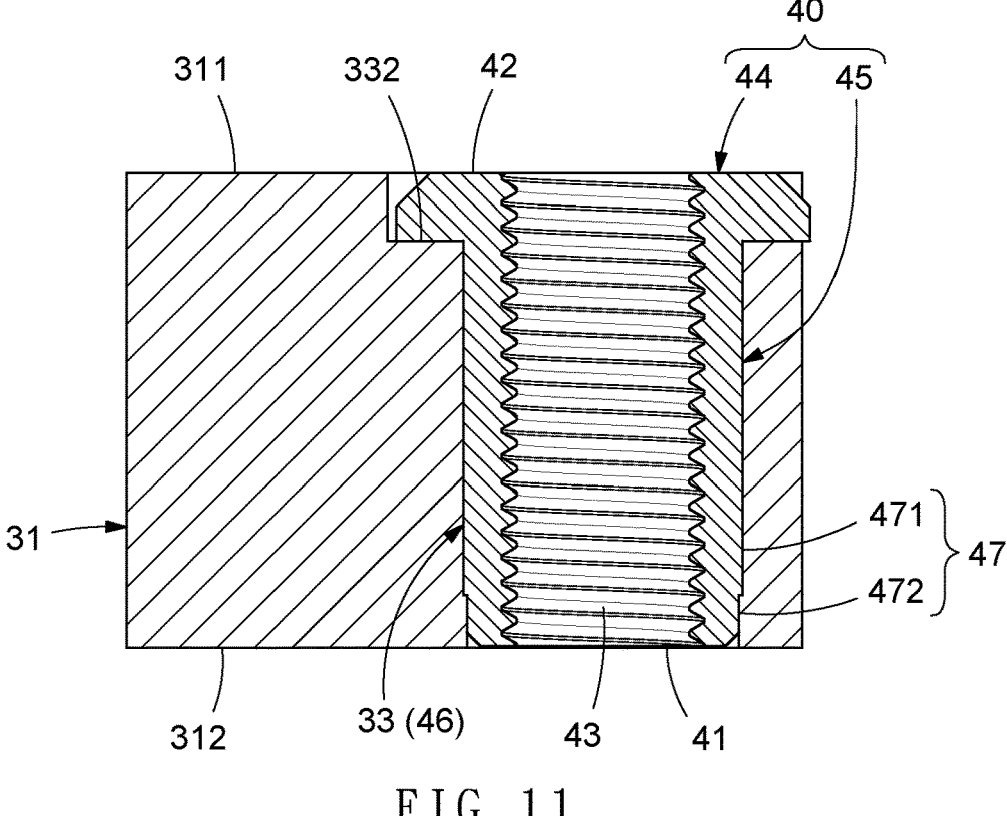

By means of the rough outer surfaces 46 of the bushings 40 and the material characteristic that the hardness of the bushings 40 is larger than the hardness of the main body 30, the body parts 45 of the bushings 40 can be jammed, i.e., press fitted, in the through holes 33 and 34 of the main body 30 in a squeezed manner. In detail, the first end surface 41 enters the through hole 33 or 34 firstly, and the chamfering surface 48, the truncated sections 472 of the tooth portions 47 and the main sections 471 of the tooth portions 47, which are arranged in the order of small outer radius to large outer radius, are gradually squeezed into the through hole 33 or 34 to make an inner surface 331 or 341 of the through hole 33 or 34, which is originally smooth as shown in FIG. 4, damaged by the rough outer surface 46 of the bushing 40, so that the outer surface 46 of the bushing 40 bites into the inner surface 331 or 341 of the through hole 33 or 34, as shown in FIG. 8 and FIG. 9, and thereby the bushing 40 is fixedly jammed in the through hole 33 or 34. In more detail, when the body part 45 of the bushing 40 is squeezed into the through hole 33 or 34, not only the chamfering surface 48 has the guiding and positioning function, but the truncated sections 472, where the outer radius is approximately equal to or smaller than the inner radius of the associated through hole 33 or 34, can also bring the further guiding and self-alignment function, causing the main sections 471 to be squeezed into the through hole 33 or 34 in a way that the central axis C3 is parallel to the central axis C1 or C2 of the through hole 33 or 34, so that the main sections 471 taper in cross-sectional shape can bite into the inner surface 331 or 341 of the through hole 33 or 34. In this way, the bushings 40 are not only easy to be positioned and inserted into the through holes 33 and 34, but also fixed in the through holes 33 and 34 firmly. Besides, in this embodiment, the first and second through holes 33 and 34 are all counterbores, each having a shoulder portion 332 or 342. The head parts 44 of the bushings 40 are abutted on the shoulder portions 332 and 342 of the through holes 33 and 34, as shown in FIG. 10 and FIG. 11. However, the first and second through holes 33 and 34 in the present invention are unlimited to counterbores.

As a result, referring to FIG. 1, FIG. 2 and FIG. 4, the bolts 21 can be inserted through the housing 24 of the caliper device 23 and fixedly screwed into the threaded holes 43 of the bushings 40 disposed in the first through holes 33 of the connecting seat 11, and the bolts 25 can be inserted through the aforementioned connecting plate and fixedly screwed into the threaded holes 43 of the bushings 40 disposed in the second through holes 34 of the connecting seat 11. In this way, the connecting seat 11 can attain the function of connecting the disc brake 22 with the suspension system. Besides, the hardness of the bushings 40 is larger than the hardness of the main body 30, so the threaded holes 43 of the bushings 40 can be prevented from the thread tripping problem resulted from overlarge force for fixedly screwing the bolts 21 and 25 into the threaded holes 43. In addition, the bushings 40 are fixedly jammed in the through holes 33 and 34 of the main body 30, that can prevent the bushings 40 from being rotated along with the bolts 21 and 25. Under the condition that the hardness of the bushings 40 is larger than the hardness of the main body 30, the density of the main body 30 can be smaller than the density of the bushings 40, so as to attain the objective of light weight. For example, the material of the main body 30 may be aluminum alloy, and the material of the bushings 40 may be iron. Therefore, the connecting seat 11 of the present invention can combine both advantages of light weight and great connecting strength.

In another aspect, the objective of light weight is further attained by the shape design of the main body 30 of the connecting seat 11 in this embodiment. As shown in FIG. 4, the base 31 of the main body 30 includes an upper recess 315 recessed from the top surface 311 and located between the first through holes 33, and a lower recess 316 recessed from the bottom surface 312 and located between the first through holes 33. Besides, two second through holes 34 are provided on two protrusions 32 respectively, and another recess 35 is formed between the two protrusions 32. The above-described features all decrease the quantity of the material used for the main body 30, further attaining the objective of light weight.

Figure 12:
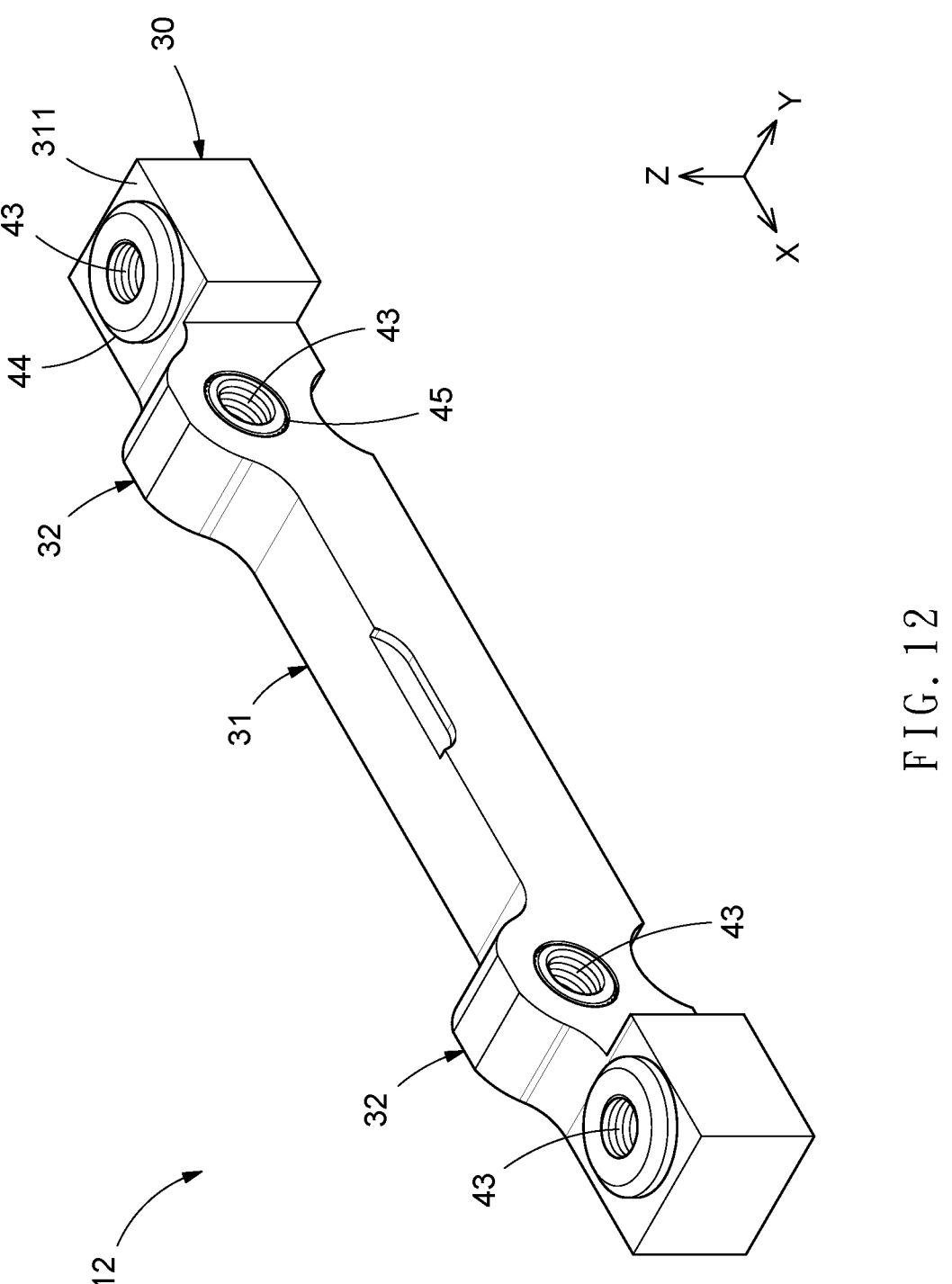
FIG. 12 and FIG. 13 are an assembled perspective view and an exploded perspective view of a connecting seat according to a second preferred embodiment of the present invention, respectively.
Figure 13:
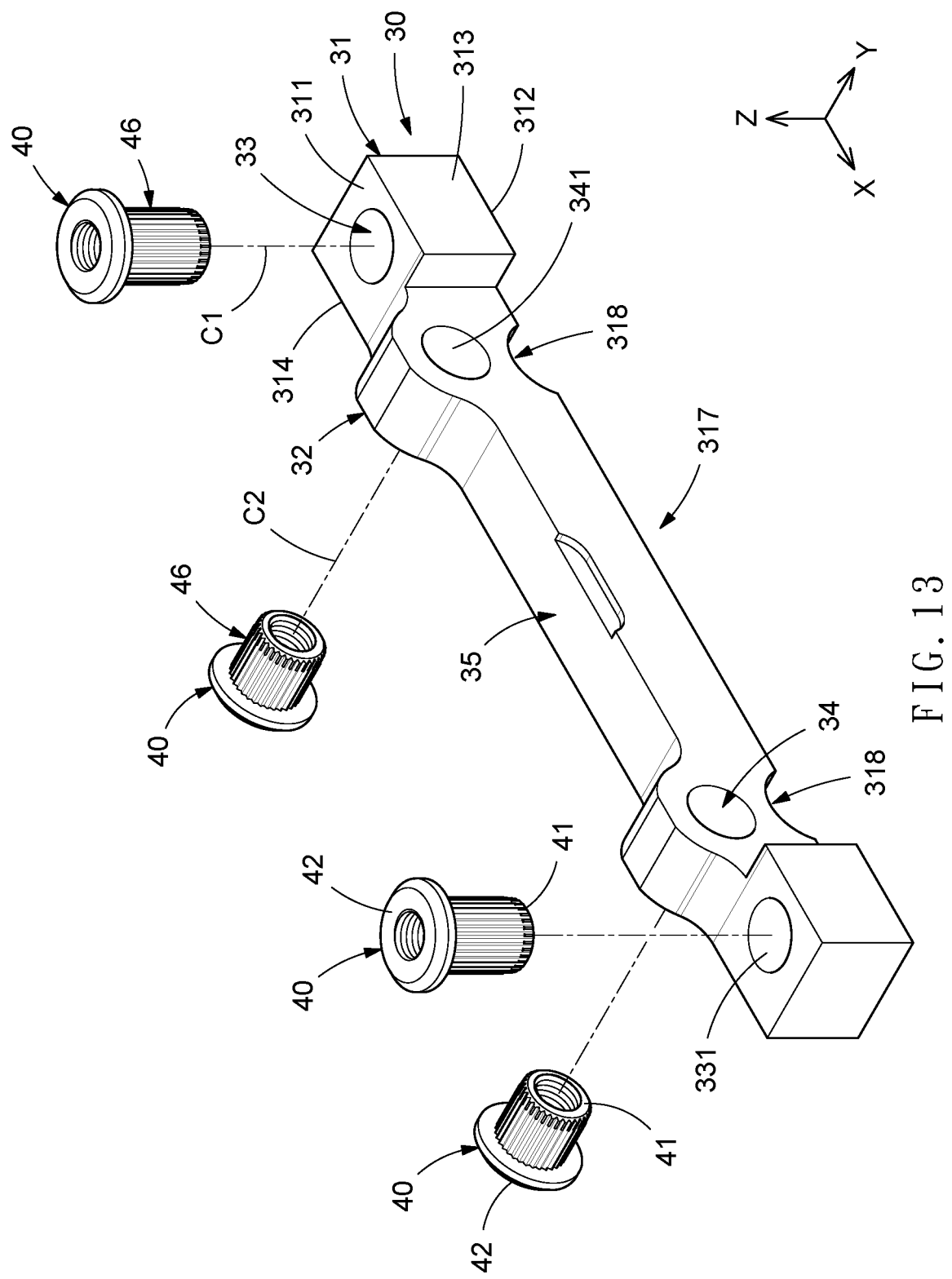

Referring to FIG. 12 and FIG. 13, a connecting seat 12 according to a second preferred embodiment of the present invention is similar in structural features, functions and effects to the above-described connecting seat 11, but the main bodies 30 of the connecting seats 11 and 12 are a little different in shape, which can be applied to different disc brake structures.

Similar to the above-described connecting seat 11, the main body 30 of the connecting seat 12 in this embodiment also includes a base 31, two protrusions 32, and a plurality of through holes 33 and 34. The plurality of through holes 33 and 34 include two first through holes 33 extending along the first axis (Z-axis), and two second through holes 34 extending along the second axis (Y-axis). The base 31 has an elongated shape. The first through holes 33 are located close to two ends of the base 31 respectively. The protrusions 32 are located between the first through holes 33, and located close to the first through holes 33 respectively. The base 31 includes a top surface 311 and a bottom surface 312, facing toward the positive and negative directions of the first axis (Z-axis) respectively, and a first side 313 and a second side 314, facing toward the positive and negative directions of the second axis (Y-axis) respectively. The first through hole 33 penetrates through the top surface 311 and the bottom surface 312. The protrusion 32 protrudes from the top surface 311 toward the positive direction of the first axis (Z-axis), and adjoins the second side 314. However, in this embodiment, the protrusion 32 protrudes from the top surface 311 of the base 31 for a relatively smaller height, and the second through hole 34 is located at both the base 31 and the protrusion 32.

Figure 14:
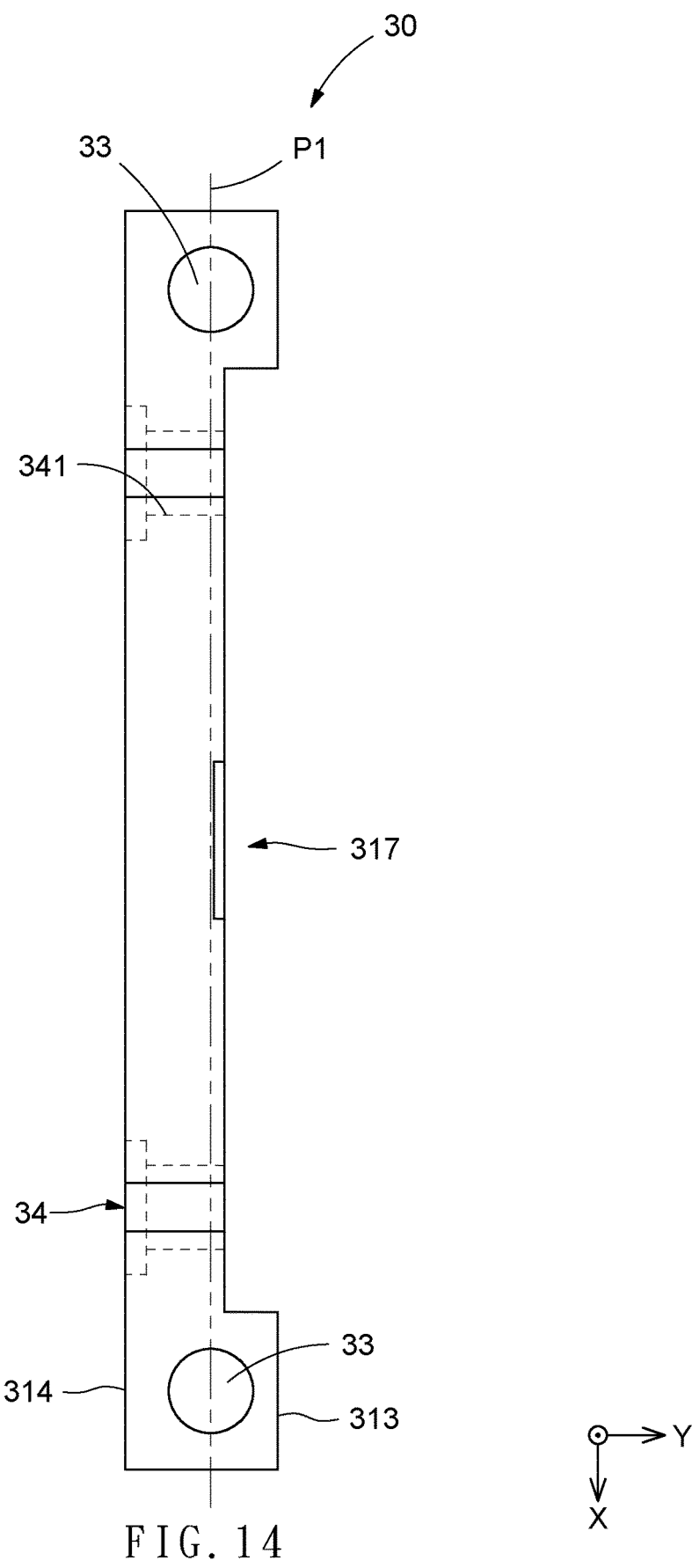
FIG. 14 and FIG. 15 are a top view and a side view of a main body of the connecting seat according to the second preferred embodiment of the present invention, respectively.
Figure 15:
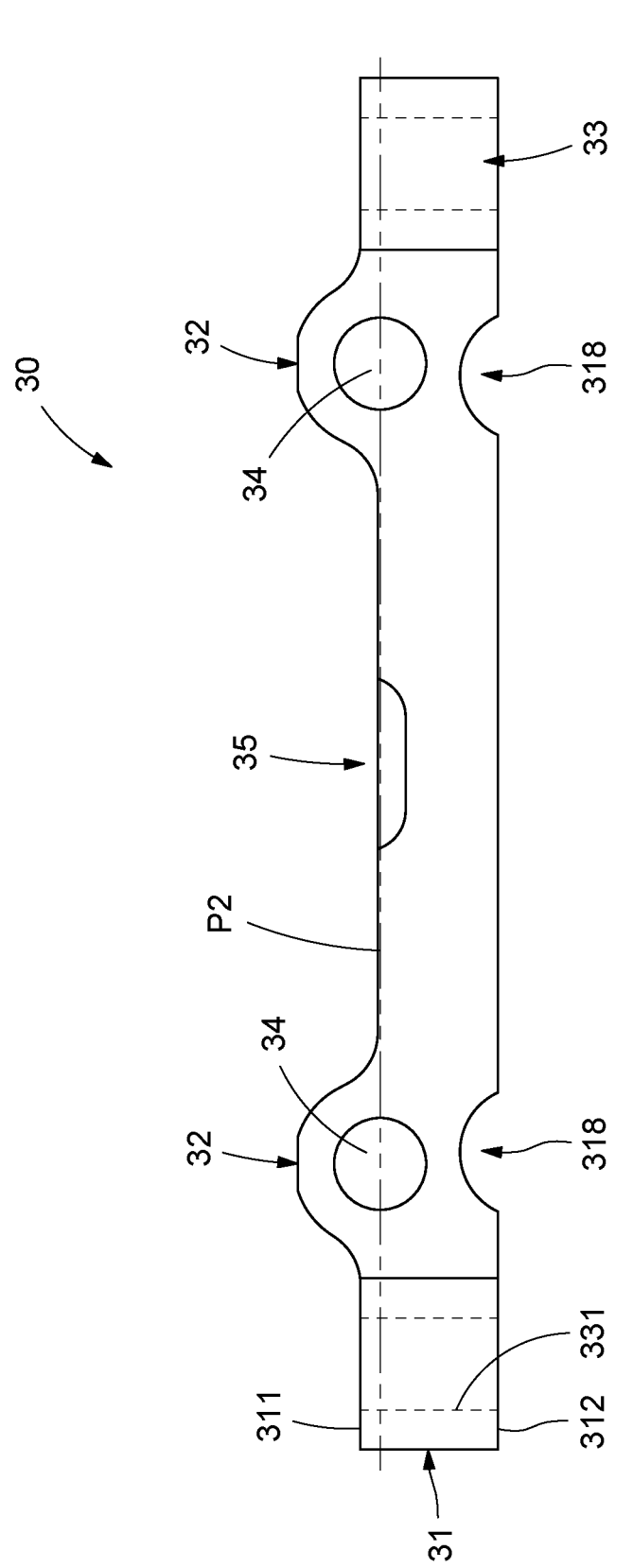
Figure 15:
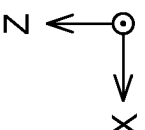

Further speaking, referring to FIG. 13 and FIG. 14, the first through hole 33 is defined with a first imaginary reference plane P1. The first imaginary reference plane P1 extends along the first axis (Z-axis) and the third axis (X-axis), and the first imaginary reference plane P1 includes the central axis C1 of the first through hole 33. In other words, the first imaginary reference plane P1 is an X-Z plane passing through the center of the first through hole 33. In this embodiment, the first imaginary reference plane P1 intersects with the second through holes 34, which means the first imaginary reference plane P1 passes through the second through holes 34. Besides, referring to FIG. 13 and FIG. 15, the second through hole 34 is defined with a second imaginary reference plane P2. The second imaginary reference plane P2 extends along the second axis (Y-axis) and the third axis (X-axis), and the second imaginary reference plane P2 includes the central axis C2 of the second through hole 34. In other words, the second imaginary reference plane P2 is an X-Y plane passing through the center of the second through hole 34. In this embodiment, the second imaginary reference plane P2 intersects with the first through holes 33, which means the second imaginary reference plane P2 passes through the first through holes 33. Such configuration design of the main body 30 makes the first through holes 33 and the second through holes 34 only deviated from each other in X-axial position, but intersect with each other in Y-axial and Z-axial positions. Such connecting seat 12 has a volume smaller than the volume of the connecting seat 11 in the first preferred embodiment, so the connecting seat 12 in this embodiment is lighter in weight. The user can choose the suitable connecting seat for different disc brake structures.

In another aspect, the objective of light weight is further attained by the design of the shape of the main body 30 of the connecting seat 12 in this embodiment. As shown in FIG. 13, the base 31 of the main body 30 includes a side recess 317 recessed from the first side 313 and located between the first through holes 33, and two lower recesses 318 recessed from the bottom surface 312 and located correspondingly to the second through holes 34 respectively. Besides, two second through holes 34 are provided on two protrusions 32 respectively, and another recess 35 is formed between the two protrusions 32. The above-described features all decrease the quantity of the material used for the main body 30, further attaining the objective of light weight.

As described above, the first and second through holes 33 and 34 in the present invention are unlimited to counterbores. For example, the first through holes 33 shown in FIG. 13 are not counterbores. As shown in FIG. 12, the head parts 44 of the bushings 40 are abutted on the top surface 311 of the base 31 of the main body 30, such that the bushings 40 can be disposed on the main body 30 firmly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A connecting seat for a disc brake, the connecting seat comprising:

a main body comprising a plurality of through holes; and a plurality of bushings fixedly jammed in the through holes respectively, a hardness of each of the bushings being larger than a hardness of the main body, each of the bushings comprising a first end surface, a second end surface, and a threaded hole penetrating through the first end surface and the second end surface, wherein each of the bushings has an outer surface comprising a plurality of tooth portions; each of the tooth portions extends parallel to a central axis of the bushing; each of the bushings is jammed into the through hole of the main body so that the tooth portions of the outer surface bites into an inner surface of the through hole, wherein each of the tooth portions comprises a main section which is tapered in cross-sectional shape, and wherein each of the tooth portions further comprises a truncated section connected with the main section; the truncated section has a top surface; among the truncated section, the top surface is farthest away from the central axis of the bushing; the main section has a peak end; among the main section, the peak end is farthest away from the central axis of the bushing; the top surface of the truncated section is closer to the central axis than the peak end of the main section is.

2. The connecting seat as claimed in claim 1, wherein each of the bushings further comprises a chamfering surface; the chamfering surface is connected between the first end surface and the truncated sections of the tooth portions.

3. The connecting seat as claimed in claim 2, wherein each of the through holes of the main body is a counterbore having a shoulder portion; each of the bushings further comprises a head part located at the second end surface; the head part of each of the bushings is abutted on the shoulder portion of one of the through holes of the main body.

4. The connecting seat as claimed in claim 1, wherein a density of the main body is smaller than a density of each of the bushings.

5. The connecting seat as claimed in claim 4, wherein the main body is made from aluminum alloy; each of the bushings is made from iron.

6. The connecting seat as claimed in claim 1, wherein the through holes of the main body comprise at least one first through hole extending along a first axis, and at least one second through hole extending along a second axis; the first axis and the second axis are perpendicular to each other.

7. The connecting seat as claimed in claim 6, wherein the first through hole is defined with a first imaginary reference plane; the first imaginary reference plane extends along the first axis and a third axis perpendicular to the first axis and the second axis; a central axis of the first through hole is located on the first imaginary reference plane; the first imaginary reference plane is separated from the second through hole; the second through hole is defined with a second imaginary reference plane; the second imaginary reference plane extends along the second axis and the third axis; a central axis of the second through hole is located on the second imaginary reference plane; the second imaginary reference plane is separated from the first through hole.

8. The connecting seat as claimed in claim 6, wherein the main body comprises a base and at least one protrusion; the base comprises a top surface and a bottom surface facing toward a positive direction and a negative direction of the first axis respectively, and a first side and a second side facing toward a positive direction and a negative direction of the second axis respectively; the first through hole penetrates through the top surface and the bottom surface, and adjoins the first side; the protrusion protrudes from the top surface toward the positive direction of the first axis, and adjoins the second side; the second through hole penetrates through the protrusion.

9. The connecting seat as claimed in claim 8, wherein the main body comprises two said first through holes; the base of the main body comprises an upper recess recessed from the top surface and located between the two first through holes, and a lower recess recessed from the bottom surface and located between the two first through holes.

10. The connecting seat as claimed in claim 6, wherein the first through hole is defined with a first imaginary reference plane; the first imaginary reference plane extends along the first axis and a third axis perpendicular to the first axis and the second axis; a central axis of the first through hole is located on the first imaginary reference plane; the first imaginary reference plane intersects with the second through hole; the second through hole is defined with a second imaginary reference plane; the second imaginary reference plane extends along the second axis and the third axis; a central axis of the second through hole is located on the second imaginary reference plane comprises; the second imaginary reference plane intersects with the first through hole.

11. The connecting seat as claimed in claim 6, wherein the main body comprises a base and at least one protrusion; the base comprises a top surface and a bottom surface facing toward a positive direction and a negative direction of the first axis respectively, and a first side and a second side facing toward a positive direction and a negative direction of the second axis respectively; the first through hole penetrates through the top surface and the bottom surface; the protrusion protrudes from the top surface toward the positive direction of the first axis, and adjoins the second side; the second through hole is located at both the base and the protrusion.

12. A connecting seat for a disc brake, the connecting seat comprising:

a main body comprising a plurality of through holes; and a plurality of bushings fixedly jammed in the through holes respectively, a hardness of each of the bushings being larger than a hardness of the main body, each of the bushings comprising a first end surface, a second end surface, and a threaded hole penetrating through the first end surface and the second end surface, wherein the through holes of the main body comprise at least one first through hole extending along a first axis, and at least one second through hole extending along a second axis; the first axis and the second axis are perpendicular to each other, wherein the main body comprises a base and at least one protrusion; the base comprises a top surface and a bottom surface facing toward a positive direction and a negative direction of the first axis respectively, and a first side and a second side facing toward a positive direction and a negative direction of the second axis respectively; the first through hole penetrates through the top surface and the bottom surface; the protrusion protrudes from the top surface toward the positive direction of the first axis, and adjoins the second side; the second through hole is located at both the base and the protrusion, and wherein the main body comprises two said first through holes, two said protrusions located between the two first through holes, and two said second through holes penetrating through the two protrusions respectively; the base of the main body comprises a side recess recessed from the first side and located between the two first through holes, and two lower recesses recessed from the bottom surface and located correspondingly to the two second through holes respectively.

* * * * *